US008535543B2

(12) United States Patent
Fetrow

(10) Patent No.: US 8,535,543 B2
(45) Date of Patent: Sep. 17, 2013

(54) SEPARATION OF PARTICULATE MATTER AND ANIMAL MANURE

(71) Applicant: John Patrick Fetrow, Mahtomedi, MN (US)

(72) Inventor: John Patrick Fetrow, Mahtomedi, MN (US)

( * ) Notice: Subject to any disclaimer, the term of this patent is extended or adjusted under 35 U.S.C. 154(b) by 0 days.

(21) Appl. No.: 13/660,391

(22) Filed: Oct. 25, 2012

(65) Prior Publication Data

US 2013/0053232 A1 Feb. 28, 2013

Related U.S. Application Data

(62) Division of application No. 12/615,646, filed on Nov. 10, 2009, now Pat. No. 8,317,034.

(60) Provisional application No. 61/199,177, filed on Nov. 13, 2008.

(51) Int. Cl.
*B01D 21/26* (2006.01)

(52) U.S. Cl.
USPC ..... 210/787; 210/360.1; 210/374; 210/380.3; 210/396; 210/402; 210/403; 210/407; 494/37

(58) Field of Classification Search
USPC .................. 210/781, 787, 360.1, 374, 380.3, 210/396, 402, 403, 407
See application file for complete search history.

(56) References Cited

U.S. PATENT DOCUMENTS

| | | | | |
|---|---|---|---|---|
| 2,083,674 | A | 6/1937 | Smith | |
| 2,948,593 | A | 8/1960 | Larson | |
| 4,062,776 | A | 12/1977 | Blok | |
| 4,098,648 | A | 7/1978 | Kraemer et al. | |
| 4,230,561 | A | 10/1980 | McMurray | |
| 4,507,202 | A | 3/1985 | Nord et al. | |
| 4,597,861 | A | 7/1986 | Wright | |
| 5,480,556 | A | 1/1996 | Ulan | |
| 5,518,614 | A | 5/1996 | Zittel | |
| 5,618,424 | A | 4/1997 | Nagaoka | |
| 5,645,714 | A | 7/1997 | Strand et al. | |
| 6,168,102 | B1 | 1/2001 | Bergart | |
| 6,227,379 | B1 * | 5/2001 | Nesseth | 210/403 |
| 2006/0273048 | A1 | 12/2006 | Doyle et al. | |

* cited by examiner

*Primary Examiner* — David A Reifsnyder
(74) *Attorney, Agent, or Firm* — Kagan Binder, PLLC

(57) ABSTRACT

The present invention relates to separating one or more of sand and other particulate matter from a mixture of animal waste and water. The present invention can help to control the discharge of noxious odors while processing material containing animal waste. An exemplary apparatus in accordance with the present invention includes a cylindrical housing and a non-rotating collection table. An exemplary apparatus in accordance with the present invention includes optional shield provided inside the cylindrical housing that can help to capture the particulate matter and that can also help to reduce the discharge of noxious gas and odors from the apparatus.

14 Claims, 5 Drawing Sheets

SEPARATION OF PARTICULATE MATTER AND ANIMAL MANURE

CROSS REFERENCE TO RELATED APPLICATIONS

The present application is a divisional application of U.S. application Ser. No. 12/615,646 filed Nov. 10, 2009, which claims the benefit of U.S. Provisional Application No. 61/199,177 filed Nov. 13, 2008, the entire contents of which are incorporated herein by reference for all purposes.

TECHNICAL FIELD

The present invention relates generally to separation of particulate matter and animal manure.

BACKGROUND

Sand is an excellent bedding material for animal housing. For example, sand is increasingly used as a bedding material on dairy farms for cows. When sand is used as animal bedding, the sand inevitably becomes mixed with animal waste such as manure and urine. Water is typically used to one degree or another for cleaning or for flushing and transporting the manure and sand mixture. The mixture of sand and manure and water must inevitably be dealt with. Quite commonly, the mixture is pushed, flushed, or otherwise transported to some sort of sluice where the mixture is transported by a rapidly flowing water stream to a site on the farm for further processing or storage. There is a need to separate the sand from the water, dissolved materials, and suspended manure so the sand can be re-used as bedding thus saving expense, transport, and sand disposal costs, for example. The sand-free manure and water mix can be more easily stored, pumped, used as fertilizer, or further processed in applications such as manure digesters. If the difficulty of moving and handling sand and sand laden manure can be minimized, hygiene for animals and the general farm operation are improved, environmental regulatory proscriptions can be properly met (such as reduction of emissions of undesirable gases and odors) and the abrasive impact of sand on equipment on the dairy can be reduced.

SUMMARY

The present invention thus provides apparatuses and methods of separating sand or other inorganic particulate matter from a mixture of manure, sand, and water. In an exemplary apparatus in accordance with the present invention, a rotating cylindrical device for separating sand or other inorganic particulate matter from a mixture of manure is provided. End plates hold the mixture at a specified level within the cylinder, and are open near the center for input of materials at one end and discharge of materials at the other. Helical vanes inside the cylinder encourage sand to settle out of the mixture and then convey the settled sand to the discharge end of the cylinder. Water, dissolved materials and suspended manure solids flow out of the central opening in the discharge end plate of the separator and are conveyed away from the separator. Sand is lifted by paddles at the discharge end of the cylinder to be dropped onto a sand collection table that extends through the cylinder and out of the discharge end. Preferably, the sand collection table does not rotate with the cylinder. Sand deposited on the sand collection table slides down to an auger or other conveyor and is transported out of the discharge end of the separator to be reused as cleaned sand. The design of the separator sand table and shield also advantageously controls the discharge of noxious gas and odor during the separation process.

Apparatuses in accordance with the present invention provide a mechanical system for separating sand or other particulate inorganic material from a mixture with manure and water with materials flowing through the apparatus in the same direction. A helical vane or vanes arranged inside the cylinder encourages sand to preferentially settle out of the mixture, by slowing the flow of water across the cross section of the rotating cylinder and on the downstream side of the vane and allowing the more dense sand to settle out of the mixture, by the centrifugal action of the cylinder as the cylinder turns, and by creating eddies behind the vane(s), further pushing sand toward the periphery and providing a turbulent interface that will clean the sand and keep manure solids in suspension.

The helical vane transports the separated sand from the input end of the apparatus toward the discharge end. At the discharge end, paddles lift the cleaned separated sand out of the flow and drop the sand onto a suspended sand collection table where sand slides down to an auger or transport device and is conveyed out of the discharge end of the apparatus. The sand collection table as shown includes optional shields that extend down the sides of the apparatus to protect the separated sand from the main flow of water, preventing the sand from being resuspended as the sand is moved down the cylinder by the helical vane(s) and as the sand is lifted out of the water by the paddles. Sand that is carried up to the sand collection table is preferably conveyed out of the discharge end of the cylinder on an extension of the sand table to a point where the sand can be collected for reuse.

Water, dissolved materials and suspended manure solids flow over the discharge lip of the opening of the discharge end plate (but under the sand collection table) into a trough or pipe that conveys the materials way from the apparatus.

Apparatuses in accordance with the present invention may also include aspects that advantageously reduce the release of noxious gases and odors during the process of separation and include at least containment of materials and gases within the cylinder, shield design to extend below the water line to isolate gases within the separation channel, ability to largely cover the input and discharge opening, for example. Because the optional shield extends down below the water line, the shield creates an area on the outside of the cylinder where there is little flow next to the paddles. The same shield limits the release of noxious gas and odors from moving above the sand collection table. The shield serves the same two purposes for the full length of the cylinder, both where the helical vanes and the paddles are positioned. As the paddles lift the separated sand out of the water, there is little flow between the shield and the outside cylinder wall to dislodge the settled sand and resuspend the sand into the water. Because the shield extends below the water, the shield also functions to trap odor and noxious gas in the center of the cylinder. This helps to prevent any significant release of gas up into the open area above the sand collection table. Covers at the input and discharge ends of the apparatus also function to trap odors and gasses with in the cylinder, greatly mitigating issues of air quality from the separation process.

In an aspect of the present invention an apparatus for separating particulate matter and animal manure is provided. An exemplary apparatus preferably comprises a machine frame; a cylindrical housing rotatably supported by the machine frame thereby rotatable about a central axis of the cylindrical housing, the cylindrical housing having first and second opposite ends spaced apart along the central axis of the cylindrical housing, the first end having an endplate with an input opening for providing material to be processed to an interior space of the cylindrical housing, the second end having an endplate with a discharge opening for removing processed material from the interior space of the cylindrical housing; one or more helical vanes positioned within the interior space of the cylindrical housing and rotatable with the cylindrical housing; at least one surface to receive particulate matter separated from the material to be processed, at least one surface positioned within the cylindrical housing and positioned along the central axis of the cylindrical housing; a transport device to remove particulate matter separated from the material to be processed, the transport device positioned relative to the at least one surface; and a device to controllably rotate the cylindrical housing.

In another aspect of the present invention, an exemplary apparatus for separation particulate matter and animal manure, such as the exemplary apparatus described above, preferably comprises a first arcuate plate that extends from the first angular plate and a second arcuate plate that extends from the second angular plate wherein the first and second arcuate plates are positioned to prevent material carried by the one or more helical vanes and paddles from falling from the one or more helical vanes or paddles before such material can fall to one or both of the first and second angular plates.

In another aspect of the present invention, an apparatus for separating particulate matter and animal manure is provided. An exemplary apparatus preferably comprises a machine frame; a cylindrical housing rotatably supported by the machine frame thereby rotatable about a central axis of the cylindrical housing, the cylindrical housing having first and second opposite ends spaced apart along the central axis of the cylindrical housing, the first end having an endplate with an input opening for providing material to be processed to an interior space of the cylindrical housing, the second end having an endplate with a discharge opening for removing processed material from the interior space of the cylindrical housing; one or more helical vanes positioned within the interior space of the cylindrical housing and rotatable with the cylindrical housing, the one or more helical vanes positioned along a first portion of the cylindrical housing; one or more plates positioned within the interior space of the cylindrical housing and rotatable with the cylindrical housing, the one or more plates positioned along a second portion of the cylindrical housing; at least one surface to receive particulate matter separated from the material to be processed, the at least one surface positioned within the cylindrical housing, not rotatable, and positioned along the central axis of the cylindrical housing; a transport device to remove particulate matter separated from the material to be processed, the transport device positioned relative to the at least one surface; and a device to controllably rotate the cylindrical housing.

In yet another aspect of the present invention, a method for separating particulate matter and animal manure is provided. The method comprises providing a cylindrical rotatable housing having an interior space and a helical vane structure that rotates with the cylindrical rotatable housing in at least a portion of the interior space and at least one particulate matter collection surface that is fixed relative to the cylindrical rotatable housing in at least a portion of the interior space; providing material comprising particulate matter and animal manure to the interior space; rotating the cylindrical rotatable housing to provide centrifugal force to the material; creating differential rates of flow of the material by generating eddies behind at least a portion of the helical vane structure; extracting particulate matter from the material and depositing the particulate matter on the collection surface; and removing the particulate matter from the cylindrical rotatable housing.

BRIEF DESCRIPTION OF THE DRAWINGS

The accompanying drawings, which are incorporated in and constitute a part of this disclosure, illustrate several aspects of the present invention and together with description of the exemplary embodiments serve to explain the principles of the present invention. A brief description of the drawings is as follows.

DESCRIPTION

The exemplary embodiments of the present invention described herein are not intended to be exhaustive or to limit the present invention to the precise forms disclosed in the following detailed description. Rather the exemplary embodiments described herein are chosen and described so those skilled in the art can appreciate and understand the principles and practices of the present invention.

Figure 1:
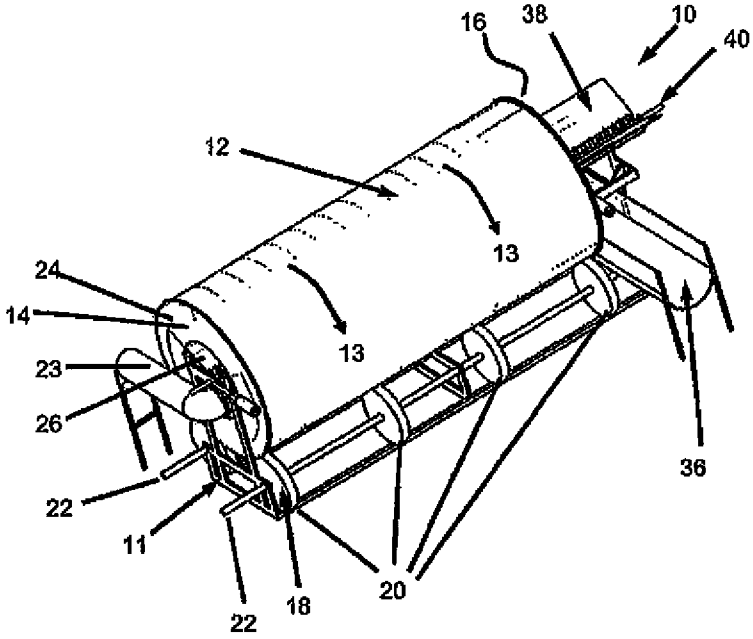
FIG. 1 is a perspective view of an exemplary sand separator apparatus having a rotatable cylinder in accordance with the present invention.
Figure 2:
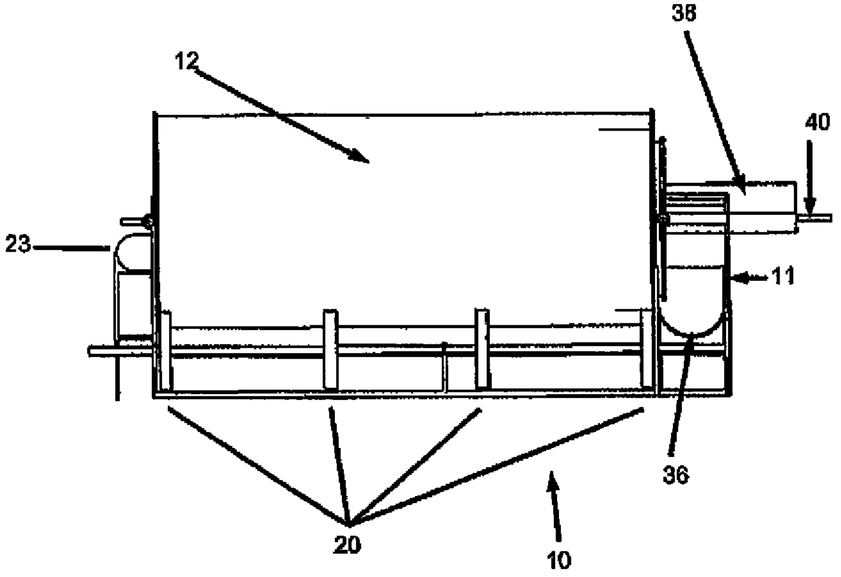
FIG. 2 is a side view of the apparatus shown in FIG. 1.
Figure 3:
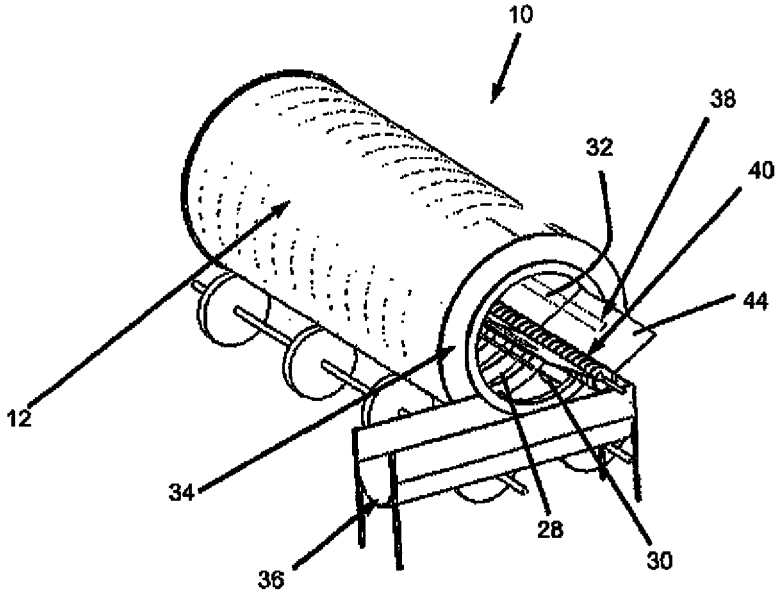
FIG. 3 is a perspective view of the apparatus shown in FIG. 1 and showing in particular a discharge end of the apparatus.

Referring to FIGS. 1, 2, and 3 initially, an exemplary apparatus 10 in accordance with the present invention is shown and comprises rotatable cylindrical housing 12 having input end 14 and discharge end 16. As illustrated, cylindrical housing 12 is driven by drive mechanism 18 and operatively supported by a machine frame 11. For example, as shown, cylindrical housing 12 rides on wheels 20 provided on spaced apart axles 22. Wheels 20 support cylindrical housing 12 and rotatably drive cylindrical housing 12 on the central axis of cylindrical housing 12 in rotational direction 13. Any drive device, system, and/or apparatus can be used to cause rotation of cylindrical housing 12. Additionally, a control system such as one including a computer or the like can be used to control and/or monitor operation of apparatus 10.

A mixture of material to be processed by apparatus 10 typically includes sand, water, and manure but may include other components. The material to be processed preferably flows and/or is pumped or otherwise provided to input end 14 of cylindrical housing 12. In the exemplary illustrated apparatus 10, material to be processed is provided by pipe 23 positioned relative to input end 14 of cylindrical housing 12. As shown, cylindrical housing 12 comprises exemplary endplate 24 at input end 14, which comprises opening 26. Pipe 23 is preferably designed to feed material into the interior space of cylindrical housing 12 via opening 26.

Figure 7:
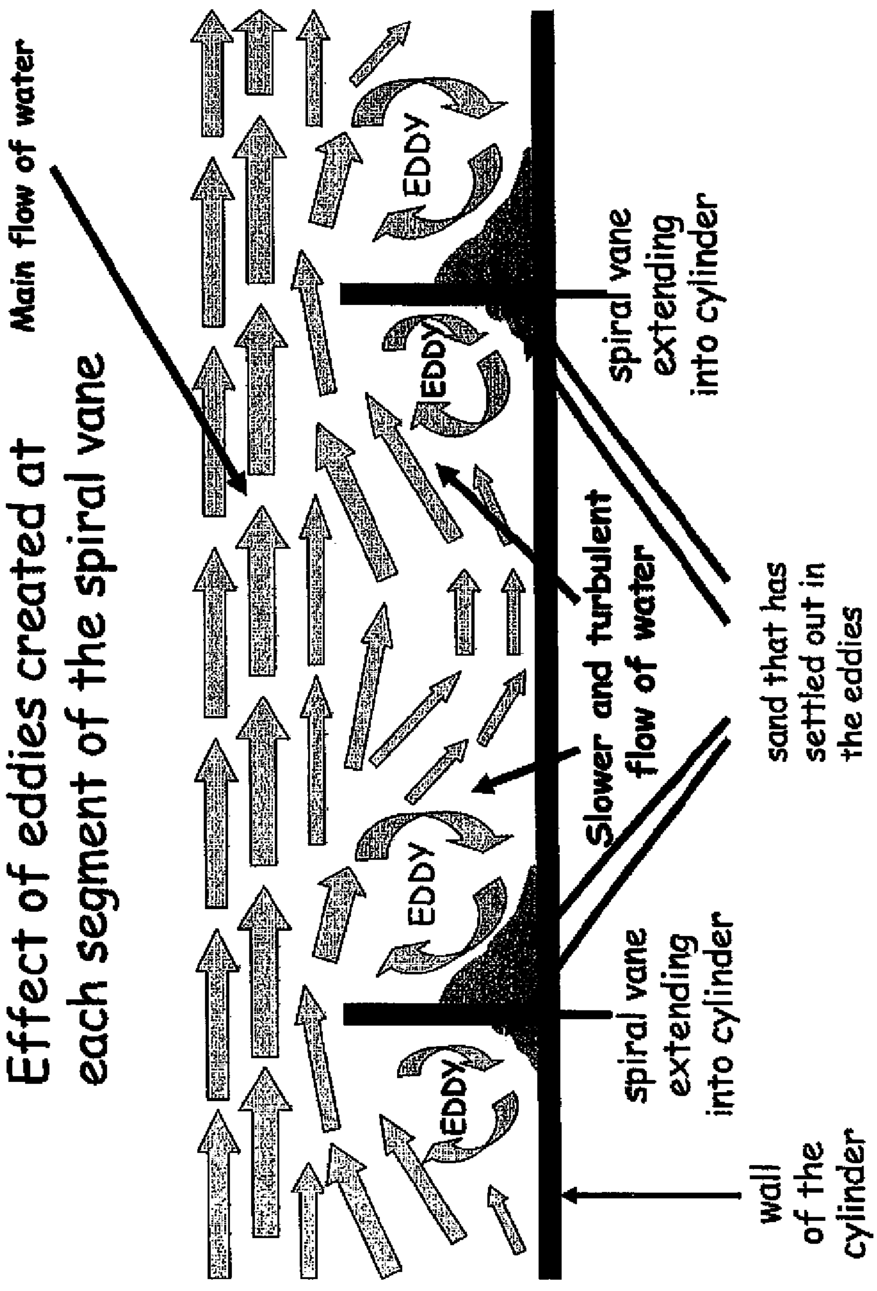
FIG. 7 is a schematic view of the flow of water across a helical vane provided within the cylinder of the apparatus of FIG. 1. While the main flow of water flows above the helical vane, there is also an eddy created that provides turbulence that washes manure solids free from the sand and to force sand outward to settle in the slow flow areas near the vane and on the outside of the cylinder.

Cylindrical housing 12 also comprises an internal helical (spiral) vane 28 as illustrated in the exemplary embodiment of apparatus 10. Helical vane 28 preferably comprises a structure that coils diagonally around the inside of cylindrical housing 12. Helical vane 28 preferably extends from input end 14 to a location spaced from discharge end 16. Helical vane 28 may comprise a single plate or the like or may comprise plural parts assembled to provide the desired structure and function. Helical vane 28 is designed so a predetermined portion of the material in cylindrical housing 12 flows through cylindrical housing 12 generally unimpeded, while providing an area on the periphery of cylindrical housing 12 behind helical vane 28 where flow is generally impeded and/or interrupted and the speed of the flowing materials is reduced. See FIG. 7, for example.

Figure 4:
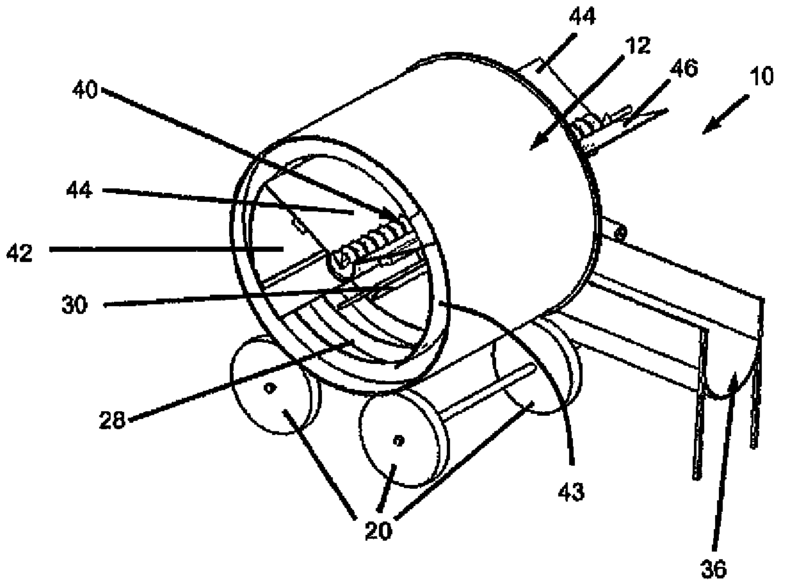
FIG. 4 is a cross sectional view of the apparatus shown in FIG. 1 taken through the apparatus generally perpendicular to the long axis of the cylinder and cut near the discharge end of the separator.
Figure 5:
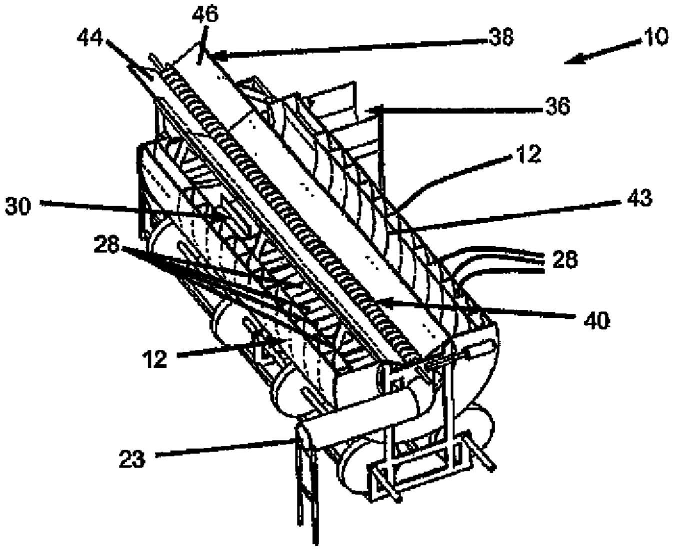
FIG. 5 is a cross sectional view of the apparatus shown in FIG. 1 taken through the apparatus generally parallel to the long axis of the cylinder.
Figure 6:
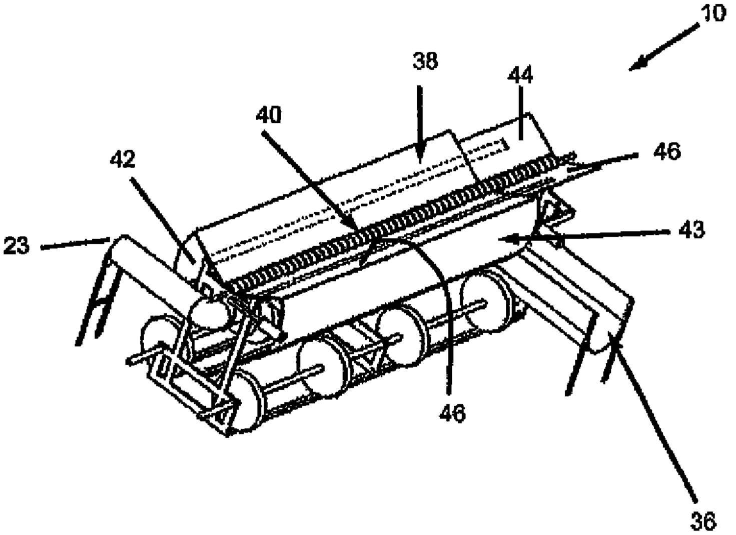
FIG. 6 is a partial schematic view of the apparatus shown in FIG. 1 without the rotatable cylinder and showing in particular an exemplary shield and sand collection table.

At a predetermined position from discharge end 16, helical vane 28 preferably ends. In the space between the end of helical vane 28 and discharge end 16 of cylindrical housing 12, a series of paddles 30 or plates are preferably provided. Preferably, paddles 30 have a height similar to helical vane 28, but any desired height can be used. Preferably, paddles 30 are arranged nearly parallel to the central axis of cylindrical housing 12, but any desired functional orientation can be used. Paddles 30 are preferably distributed around at least a portion of the circumference of the inside of cylindrical housing 12 at discharge end 16. See FIGS. 4 and 5, in particular.

Cylindrical housing 12 is turned/rotated during operation and in use. Water and manure solids (which are much more easily suspended and/or float in the water) flow through cylindrical housing 12 and over the lip of discharge opening 32 of end plate 34 at discharge end 16 and into discharge trough 36. This mixture of water and manure is collected in discharge trough 36 and transferred either for further processing or for storage in the manure system of the farm, for example. Within cylindrical housing 12, sand settles out of the suspension and is caught behind one or more portions of helical vane 28. See FIG. 7, in particular. As cylindrical housing 12 turns, helical vane 28 gradually moves the sand to discharge end 16 of cylindrical housing 12 where the sand is lifted out of the water and dropped onto sand collection table 38 that is positioned above the flowing stream of material.

The exemplary sand collection table 38 shown in the Figures preferably extends from outside discharge end 16 of cylindrical housing 12 through opening 26 and into cylindrical housing 12. Sand collection table 38 preferably includes inclined or angled collection surfaces 44 and 46 to receive particulate matter separated from the material being processed. As shown, surfaces 44 and 46 comprise angularly oriented plates. Preferably, surfaces 44 and 46 are positioned within cylindrical housing 12 and are positioned along the central axis of cylindrical housing 12. See FIGS. 1, 2, 3, 5, and 6, in particular. In use sand collection table 38 does not rotate with cylindrical housing 12. Sand collection table 38 is designed to be located above the flowing water level and is designed to be wide enough that sand collection table 38 does not interfere with helical vane 28 and paddles 30 as they rotate. As shown, sand collection table 38 protrudes out of cylindrical housing 12 at discharge end 16 of cylindrical housing 12 above the lip of opening 26 of endplate 24.

Sand collection table 38 is designed to allow water and manure solids to flow under the sand collection table 38 and out of cylindrical housing 12 to be captured and transported away from apparatus 10. Collection surfaces 44 and 46 of sand collection table 38 preferably slope toward the central axis of cylindrical housing 12 to a central trough where a conveyor or transport device such as illustrated auger 40 (drive mechanism not shown) can transport cleaned sand from sand collection table 38 and out of discharge end 16. Preferably, in an exemplary configuration, auger 40 is positioned relative to an intersection of the surfaces 44 and 46. The slope of surfaces 44 and 46 can be determined empirically.

Figure 8:
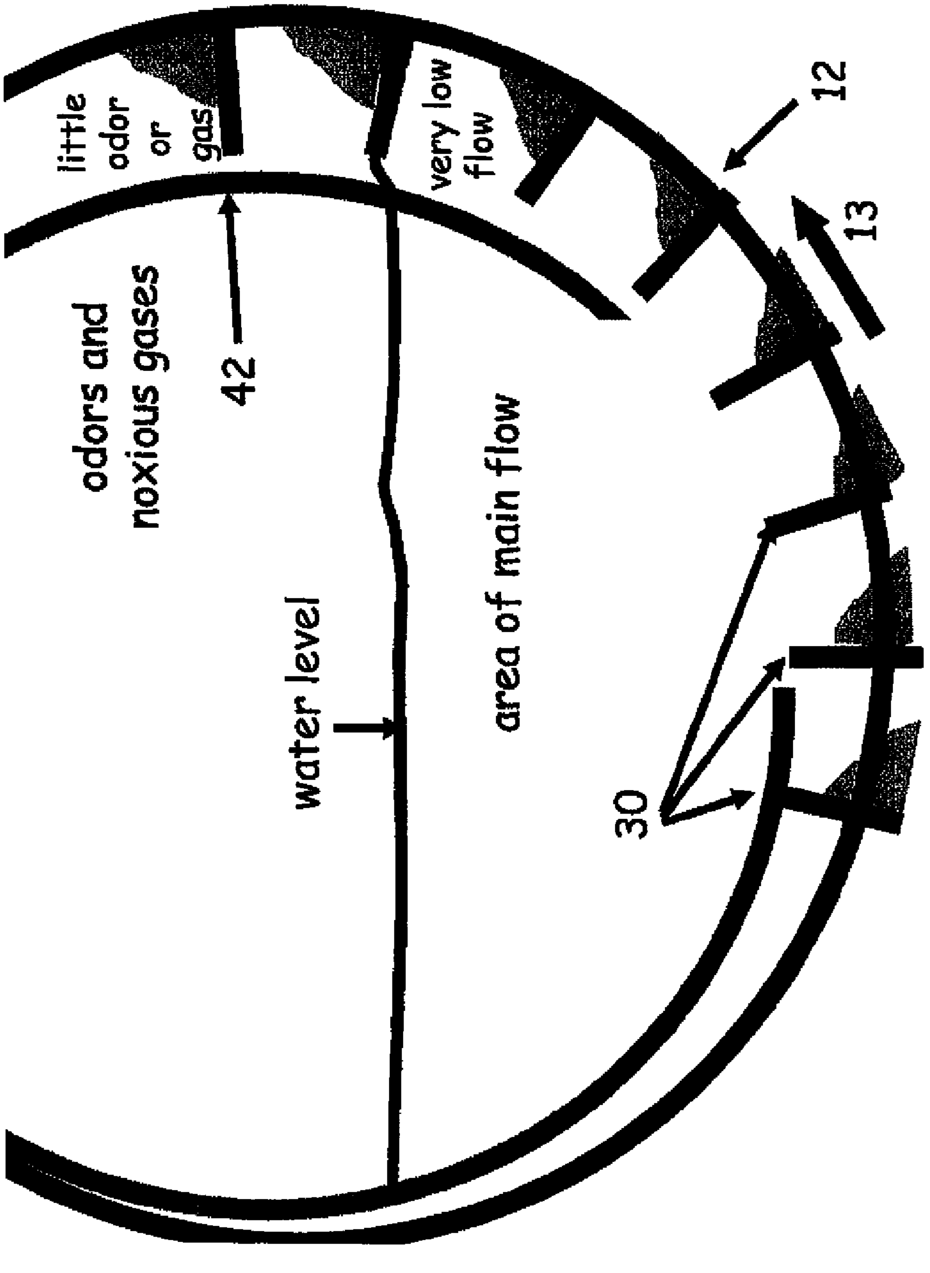
FIG. 8 is a schematic partial cross sectional view taken across the discharge end of an exemplary cylinder where the paddles lift the sand out of the water in accordance with the present invention.

In the exemplary embodiment shown in the Figures, sand collection table 38 includes optional shields 42 and 43 that extend from the top edge of each surface 44 and 46 of sand collection table 38 down the sides of cylindrical housing 12 inside helical vane 28 and paddles 30 until shields 42 and 43 reach below the water level. As shown, shields 42 and 43 comprise arcuate plates. See FIGS. 4, 5, 6, and 8, in particular. Preferably, shield 42 and 43 are positioned to prevent material carried by helical vane 28 from falling from helical vane 28 before the material can fall to one or both of shields 42 and 43. By extending a short distance into the water, shields 42 and 43 help protect the separated sand from being exposed to flowing water and being resuspended as the sand is lifted up through the surface of the water while being transported toward the discharge end 16 of cylindrical housing 12 by helical vane 28 or dropped onto the top of sand collection table 38 by paddles 30. This arrangement also advantageously reduces the discharge of odors and gas, forming and functioning as a seal for most of cylindrical housing 12 above the main flow of manure and water. See FIG. 8, in particular.

The separation of the manure and water from the sand in accordance with apparatuses of the present invention generally relates to at least 1) differential densities (sand being denser than water or manure solids) so that gravity and the centrifugal force created as cylindrical housing 12 turns, 2) water flow and turbulence to clean the sand and to keep the less dense manure in suspension, 3) the creation of "eddies" behind the helical vane 28 for sand settling and capture, 4) the design of the sand collection table 38 and shields 42 of the sand collection table 38 to prevent resuspension of the separated sand and 5) by creating a wider cross section than the input pipe, thus slowing the general speed of flow of material through the apparatus 10, for example.

In operation, sand falls out of the water flow, particularly as the speed of flow of water is slowed. As the mixture enters and flows along the length of cylindrical housing 12, water flowing over helical vane 28 will "eddy out," principally on the downstream side of helical vane 28. The denser sand settles out in the less rapidly flowing water on the downstream side of helical vane. The centrifugal motion of the turning cylinder and the fluid dynamics of the eddy behind helical vane 28 also tend to spin the sand toward the perimeter of cylindrical housing 12, in this case moving the sand to the sides of cylindrical housing 12 and behind helical vane 28. See FIG. 7, in particular. The turbulence of the water at the interface with the eddy washes manure solids (nearly the same density as water) out of the sand and keeps such solids in suspension. As the main flow of the mixture proceeds at a faster rate through cylindrical housing 12 above helical vane 28, each successive flow past helical vane 28 presents another opportunity for sand to settle while manure solids are brought into a new vortex for separation and continued suspension in the flowing water. Separated sand slides down cylindrical housing 12 while being protected from resuspension as cylindrical housing 12 turns, eventually being delivered cleaned to discharge end 16 of cylindrical housing 12.

At the end of helical vane 28, the sand moves into the area of cylindrical housing 12 having rotating paddles 30. See FIGS. 4, 5, and 8, in particular. The sand continues to move slowly toward discharge end 16 of cylindrical housing 12 along paddles 30. Paddles 30 are designed to function to lift the sand out of the water and up the side of cylindrical housing 12. At a point during rotation of cylindrical housing 12, a paddle is at a generally vertical position where the cleaned sand falls off the paddle onto sand collection table 38 within cylindrical housing 12, where the sand slides down to auger 40 and can be mechanically conveyed out of cylindrical housing 12 and collected for reuse as cleaned sand.

When compared to separation systems open to the air, apparatuses in accordance with the present invention will capture a significantly increased portion of the undesirable odors and noxious gases (e.g. ammonia, nitrous oxide, hydrogen sulfide, and methane, etc.) within the apparatus 10. The input opening 26 and discharge opening 32 are preferably covered to restrict gas and odor emissions at those points and the discharge trough 36 can be connected to a pipe to contain gases as the water and manure flow away from the apparatus 10. The design of the shields 42 and the extension of shields 42 below the water line within apparatus 10 help to restrict gas and odor release from the water/manure flow section to the area above sand collection table 38. The sand is lifted outside this mostly contained area and deposited past the end of apparatus 10 largely isolated from any discharge gases. Apparatuses in accordance with the present invention thus greatly reduce and control the environmental discharge of volatile gases and odors and may address environmental concerns about such discharge.

The relative speed of flow of materials through apparatus 10 in relation to the dimensions of apparatus 10 is preferably considered in designing apparatuses in accordance with the present invention. Water, manure, and sand should flow into apparatus 10 fast enough relative to the input pipe size to keep sand in suspension until the mix is deposited into apparatus 10. At that point, flow should be slowed enough (in concert with the design of apparatus 10 itself, i.e. helical vane 28 and shields 42) so that sand will settle out of the mixture. The desired flow rates and times for adequate sand separation are known for mixtures of sand, water, and manure.

The cross section of cylindrical housing 12 and the height of the helical vane 28 and paddles 30 generally depend on the depth of water desired to allow enough slowing of the mixture and access for sand settling behind helical vane 28. Both total cross section and cross section above helical vane 28 can be calculated. Given the total volume of flow into apparatus 10 and the cross section of flow, the speed of flow through the apparatus 10 can be calculated. Flows on dairy farms from manure sluices can vary widely depending on the farm and the number of cows. Typical total flows lie in the range of 500-1,000 gallons per minute on a large dairy. Using these numbers, the calculation shown in Table 1 below are illustrative of an exemplary apparatus in accordance with the present invention receiving 500 gallons per minute.

TABLE 1

| Sand Separator Calculations | |
|---|---|
| 500 | flow into separator (gallons/minute) |
| 120 | angle of chord (°) |
| 6.0 | diameter of cylinder (feet) |
| 5 | height of vanes and shelves (inches) |
| 231 | cubic inches per gallon |
| 115,500 | cubic inches per minute through the separator |
| 62 | width of top of water in the separator (inches) |
| 18.0 | deepest depth of water (inches) |
| 796 | total cross section of water (square inches) |
| 351 | cross section within the vane and shelves |
| 445 | cross section above the vane and shelves (free flow space) |
| 259 | inches of flow per minute |
| 22 | feet of flow per minute 0.36 ft./sec. goal: <1-2 fps |
| 40 | seconds for sand to settle goal: more than 30 seconds |
| 173 | inches of flow to settle |
| 14.4 | length of separator section (feet) |
| 2.0 | length of sand shelf lifting section (feet) |
| 16.4 | total length of separator cylinder |
| 60 | sand per cow per day (pounds) |
| 1,000 | cows |
| 60,000 | pounds of sand per day |

By altering design criteria (lines 1-4 of Table 1), the dimensions and performance of an apparatus in accordance with the present invention can be modeled. In the exemplary case above with a 500 gallon per minute input, a 6 foot diameter cylinder 16.4 feet long with a deepest depth of water at 18 inches provides the needed reduction in flow speed to below a proposed exemplary goal of less than 1-2 feet per second (in this case to 0.36 feet per second). Time is also an element of settling, and the described model provides 40 second for settling. An exemplary target settling time is about 30 seconds. In addition, the design of the apparatus will hasten sand settling compared to a flat surface without vanes and eddies. Design parameters can be determined using modeling techniques as described above, by trial and error (empirically), and combinations thereof.

Similar calculations for an exemplary apparatus in accordance with the present invention receiving 1,000 gallons per minute are shown in Table 2 below. As shown in Table 2, at this higher flow rate the cylinder could be designed to be 8 feet in diameter rather than 6 feet and with a longer cylinder length of 20.5 feet to assure adequate time for settling. Apparatuses can be designed to match the particular need and volumes for any desired farm. At higher flow rates, it is contemplated that more than one apparatus can be used, which can be provided in series or in parallel in accordance with the present invention.

TABLE 2

| Sand Separator Calculations | |
|---|---|
| 1,000 | flow into separator (gallons/minute) |
| 110 | angle of chord (.degree.) |
| 8.0 | diameter of cylinder (feet) |
| 5 | height of vanes and shelves (inches) |
| 231 | cubic inches per gallon |
| 231,000 | cubic inches per minute through the separator |
| 79 | width of top of water in the separator (inches) |
| 20.5 | deepest depth of water (inches) |
| 1,129 | total cross section of water (square inches) |
| 437 | cross section within the vane and shelves |
| 692 | cross section above the vane and shelves (free flow space) |
| 334 | inches of flow per minute |
| 28 | feet of flow per minute 0.46 ft./sec. goal: <1-2 fps |
| 40 | seconds for sand to settle goal: more than 30 seconds |
| 222 | inches of flow to settle |
| 18.5 | length of separator section (feet) |
| 2.0 | length of sand shelf lifting section (feet) |
| 20.5 | total length of separator cylinder |

The present invention has now been described with reference to several exemplary embodiments thereof. The entire disclosure of any patent or patent application identified herein is hereby incorporated by reference for all purposes. The foregoing disclosure has been provided for clarity of understanding by those skilled in the art. No unnecessary limitations should be taken from the foregoing disclosure. It will be apparent to those skilled in the art that changes can be made in the exemplary embodiments described herein without departing from the scope of the present invention. Thus, the scope of the present invention should not be limited to the exemplary structures and methods described herein, but only by the structures and methods described by the language of the claims and the equivalents of those claimed structures and methods.

What is claimed is:

1. A method for separating sand from animal manure, the method comprising:
providing a cylindrical rotatable housing having an interior space and a helical vane structure that rotates with the cylindrical rotatable housing in at least a portion of the interior space and at least one collection surface that is fixed relative to the cylindrical rotatable housing in at least a portion of the interior space;
providing material comprising water, sand and animal manure to the interior space;
rotating the cylindrical rotatable housing to provide centrifugal force to the material;
creating differential rates of flow of the material by generating eddies behind at least a portion of the helical vane structure;
extracting sand from the material and depositing the extracted sand on the collection surface; and
removing the extracted sand from the cylindrical rotatable housing.

2. The method of claim 1, further comprising:
shielding the extracted sand from reentering the material from which it was extracted.

3. The method of claim 2 wherein the shielding is by at least one arcuate plate in the interior space spaced from the cylindrical rotatable housing.

4. The method of claim 1, further comprising:
reducing the release of noxious gas and odor from the cylindrical rotatable housing.

5. The method of claim 1 wherein the cylindrical rotatable housing has a second collection surface angularly positioned relative to the at least one collection surface.

6. The method of claim 1 wherein the cylindrical rotatable housing has at least one arcuate plate in the interior space spaced from the cylindrical rotatable housing.

7. A method for separating sand from animal manure, the method comprising:
providing a separation apparatus comprising: a cylindrical rotatable housing having an interior space and a helical vane structure that rotates with the cylindrical rotatable housing in at least a portion of the interior space; one or more plates positioned at or near a discharge end of the apparatus and within the interior space of the cylindrical housing; at least one arcuate plate spaced from an inside surface of the cylindrical housing; and a collection surface that is fixed relative to the cylindrical rotatable housing;
providing material comprising water, sand and animal manure to the interior space;
rotating the cylindrical rotatable housing to provide centrifugal force to the material;
extracting sand from the material by creating differential rates of flow of the material in the interior space by generating eddies behind at least a portion of the helical vane structure;
protecting the extracted sand from re-suspension as the extracted sand is lifted by the one or more plates as they rise above the level of the material in the apparatus;
depositing the extracted sand on the collection surface; and
removing the extracted sand from the cylindrical rotatable housing.

8. The method of claim 7 further comprising:
creating differential flow rates with a faster flow rate of the material above the helical vane structure and a slower flow rates of the material in the interior space between vanes of the helical vane structure.

9. The method of claim 7 wherein protecting the extracted sand from re-suspension is by using the at least one arcuate plate to shield the sand being lifted.

10. The method of claim 7 further comprising:
containing gas and odor within the interior space of the apparatus so that release of gas and odor is managed.

11. A method for separating sand from animal manure, the method comprising:
providing a cylindrical rotatable housing having an interior space and a helical vane structure that rotates with the cylindrical rotatable housing in at least a portion of the interior space and an arcuate plate spaced from an inside surface of the cylindrical housing;
providing material comprising water, sand and animal manure to the interior space;
rotating the cylindrical rotatable housing to provide centrifugal force to the material;
creating differential rates of flow of the material by generating eddies behind at least a portion of the helical vane structure;
extracting sand from the material and depositing the extracted sand on a collection surface; and
removing the extracted sand from the cylindrical rotatable housing.

12. The method of claim 11 wherein the cylindrical rotatable housing has a second arcuate plate spaced from the inside surface of the cylindrical housing.

13. The method of claim 11 further comprising:
protecting the extracted sand from re-suspension as the extracted sand is lifted above the level of the material in the apparatus.

14. The method of claim 13 wherein protecting the extracted sand from re-suspension is by using the arcuate plate to shield the extracted sand being lifted.

* * * * *